United States Patent [19]

Hand et al.

[11] Patent Number: 5,303,523
[45] Date of Patent: Apr. 19, 1994

[54] PEST PREVENTER FOR LOCATION ON A STRUCTURAL FOUNDATION SUPPORT OR A STRUCTURE SUPPORTING A FOOD SOURCE

[76] Inventors: Herbert H. Hand, 233 Tram Rd., Columbia, S.C. 29210; Herbert G. Hand, 5426 Richenbacher Ave. #301, Alexandria, Va. 22304

[21] Appl. No.: 855,245

[22] Filed: Mar. 23, 1992

Related U.S. Application Data

[63] Continuation of Ser. No. 436,412, Nov. 14, 1989, Pat. No. 5,097,641, which is a continuation-in-part of Ser. No. 271,040, Nov. 15, 1988, Pat. No. 4,905,629, which is a continuation-in-part of Ser. No. 133,171, Dec. 11, 1987, Pat. No. 4,784,086, which is a continuation-in-part of Ser. No. 914,335, Oct. 2, 1986, abandoned.

[51] Int. Cl.$^5$ .................................. A01K 3/00
[52] U.S. Cl. .......................................... 52/101; 52/62; 119/61; 43/121
[58] Field of Search ............... 52/101, 293, 58, 62; 119/61; 43/121, 133, 132.1

[56] References Cited

U.S. PATENT DOCUMENTS

| | | |
|---|---|---|
| 42 | 4/1841 | Newhall . |
| 44,238 | 9/1864 | Towne . |
| 46,298 | 2/1865 | Hilton . |
| 49,453 | 8/1865 | Starbuck . |
| 57,937 | 9/1866 | Mathews . |
| 479,980 | 8/1892 | Gordon . |
| 481,311 | 8/1892 | Smith . |
| 784,684 | 3/1905 | Karlsen . |
| 1,221,999 | 4/1917 | Kreiter . |
| 1,496,720 | 6/1924 | Marsico . |
| 1,579,534 | 4/1926 | Hibbard et al. . |
| 2,012,651 | 8/1935 | Beall . |
| 2,112,229 | 3/1938 | Davis . |
| 2,138,182 | 11/1938 | Lipthrott . |
| 2,139,225 | 12/1938 | Easling . |
| 2,149,495 | 3/1939 | Barnard et al. . |
| 2,150,891 | 3/1939 | Tennison . |
| 2,165,500 | 7/1939 | Muirhead . |
| 2,191,811 | 2/1940 | Trampier, Sr. . |
| 2,242,266 | 5/1941 | Scales . |
| 2,253,541 | 8/1941 | Torbett . |
| 2,258,317 | 10/1941 | Clipper . |
| 2,315,989 | 4/1943 | Tennison et al. . |
| 2,554,086 | 5/1951 | Block . |
| 2,584,301 | 2/1952 | Sinclair . |
| 2,677,350 | 5/1954 | Prestidge et al. . |
| 2,746,201 | 5/1956 | Warrell . |
| 2,796,042 | 6/1957 | Cope . |
| 2,813,509 | 11/1957 | Bruno . |
| 3,147,739 | 9/1964 | Shaheen . |
| 3,195,510 | 7/1965 | Bernstein . |
| 3,441,003 | 4/1969 | Du Mond et al. . |

(List continued on next page.)

FOREIGN PATENT DOCUMENTS 2453952 12/1980 France .
472883 10/1937 United Kingdom .

OTHER PUBLICATIONS

Sear Catalogue p. 1348.
Webster's II New Riverside Dictionary, 1984, Houghton Mifflin Co. p. 809.

Primary Examiner—Peter M. Cuomo
Assistant Examiner—Suzanne L. Dino
Attorney, Agent, or Firm—McAndrews, Held & Malloy, Ltd.

[57] ABSTRACT

A termite and pest preventer for placement between the ground and a residential, commercial or industrial structure mounted above ground in such a way that termites, crawling insects, or pests are prevented from entering the aforementioned structures A combination of -tactic, ultraviolet light and other barriers are positioned with respect to the path of travel of the termite or insect from ground to the residential, commercial or industrial structure.

15 Claims, 4 Drawing Sheets

U.S. PATENT DOCUMENTS

| | | |
|---|---|---|
| 3,664,304 | 5/1972 | Carter . |
| 3,722,476 | 3/1973 | Van Ness et al. . |
| 3,995,595 | 12/1976 | Williams . |
| 4,098,018 | 7/1978 | Bartelme . |
| 4,128,080 | 12/1978 | Haney . |
| 4,328,636 | 5/1982 | Johnson . |
| 4,357,905 | 11/1982 | Carpenter . |
| 4,399,772 | 8/1983 | Salinas . |
| 4,423,564 | 1/1984 | Davies et al. . |
| 4,428,325 | 1/1984 | Koch . |
| 4,471,562 | 9/1984 | Brucker . |
| 4,691,664 | 9/1987 | Crowell . |
| 4,756,116 | 7/1988 | Cutter . |
| 4,784,086 | 11/1988 | Hand et al. . |
| 4,800,845 | 1/1989 | Budd . |
| 4,905,629 | 3/1990 | Hand et al. . |
| 5,097,641 | 3/1992 | Hand et al. ............................ 52/101 |
| 5,109,800 | 5/1992 | Williams ................................ 119/61 |

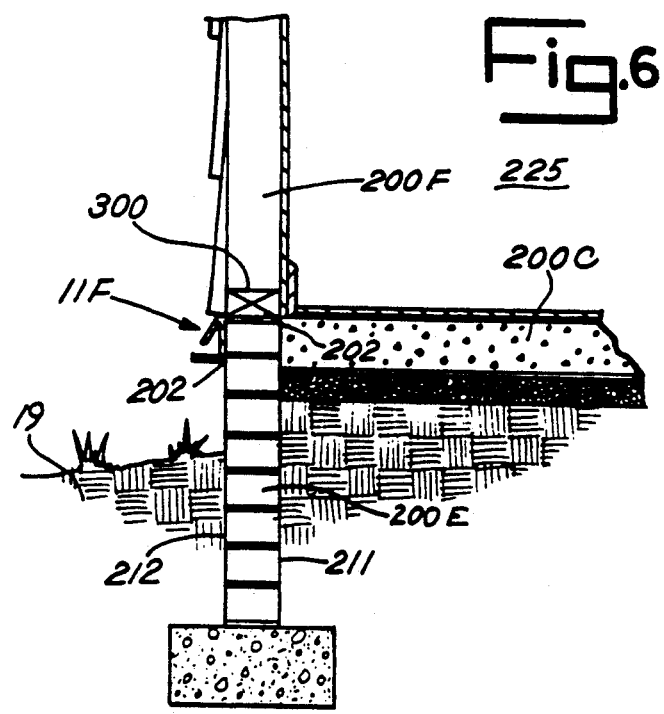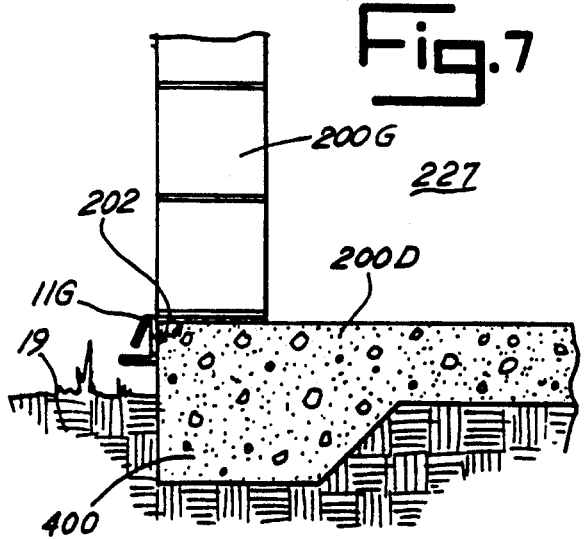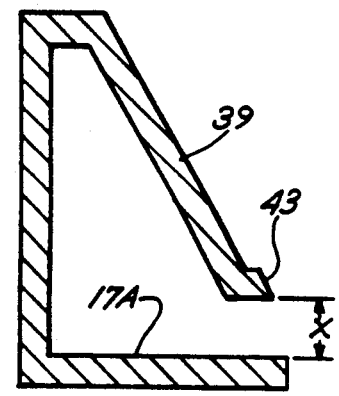

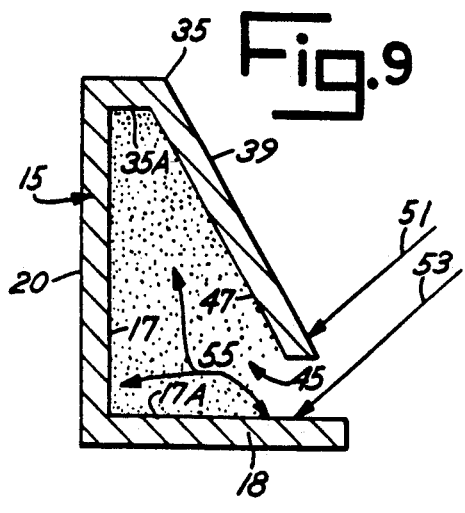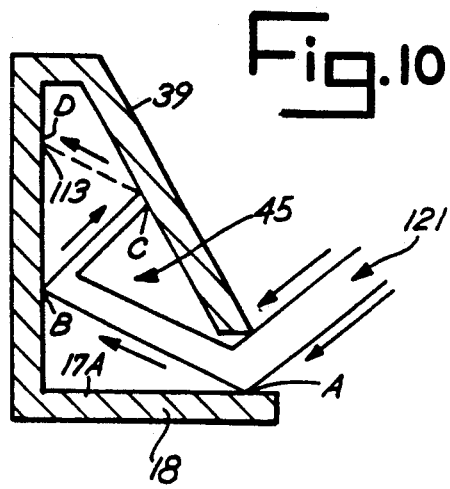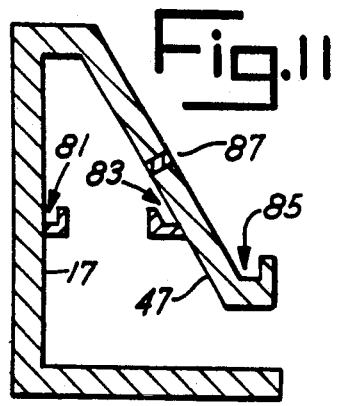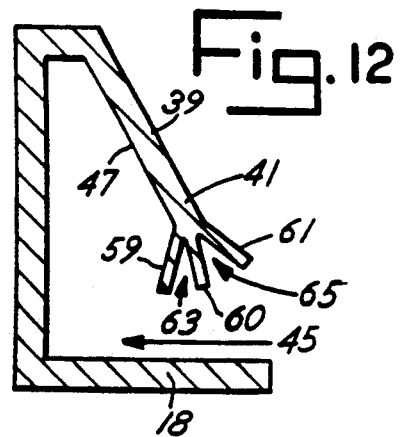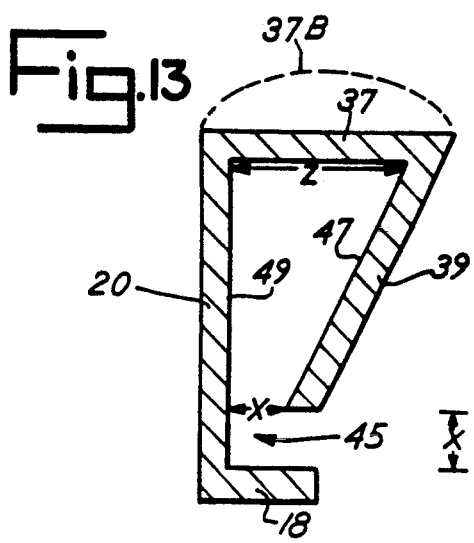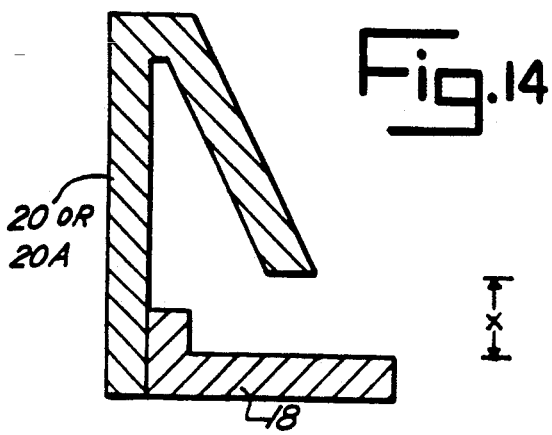

PEST PREVENTER FOR LOCATION ON A STRUCTURAL FOUNDATION SUPPORT OR A STRUCTURE SUPPORTING A FOOD SOURCE

CROSS-REFERENCE TO RELATED PATENT APPLICATIONS

This application is a continuation of U.S. Ser. No. 07/436,412, filed Nov. 14, 1989, now U.S. Patent No. 5,097,641; which is a continuation-in-part of U.S. Ser. No. 07/271,040, filed Nov. 15, 1988, now U.S. Patent No. 4,905,629; which is a continuation-in-part of U.S. Ser. No. 7/133,171, filed Dec. 11, 1987, now U.S. Pat. No. 4,784,086; which is a continuation-in-part of U.S. Ser. No. 914,335, filed Oct. 2, 1986, now abandoned. Additionally, U.S. Ser. No. 07/271,375, now U.S. Pat. No. 5,287,648 is a continuation-in-part of U.S. Ser. No. 07/434,411, now abandoned, which is another continuation-in-part of U.S. Ser. No. 07/27,040 mentioned above. All of these prior applications are hereby incorporated herein by reference.

BACKGROUND OF THE INVENTION

The invention relates to a method and apparatus for preventing termites and other crawling insects from entering, for example, houses or other structures inhabited or occupied by people and/or animals, and more particularly, relates to a method and apparatus for preventing termites, crawling insects or other crawling pests, from entering residential structures, commercial structures and industrial structures which structures are mounted on support and associated structures connected to ground.

Support and associated structures include, for example, foundation walls surrounding either a crawl space or a basement, external veneer or facia, perimeter pier construction with or without an exterior veneer, interior piers supporting the weight of the specific structure, concrete slabs with wood frame construction, and concrete slabs on either grade masonry construction or pilings.

At the present time, most residential structures, commercial structures, and industrial structures, which are mounted on support and associated structures, utilize highly toxic poisons and other devices placed across the insect pathway to prevent termites and other crawling insects and pests from reaching the residential, commercial, and industrial structures. This is particularly the case where termite or insect intrusion could cause structural damage and/or physical or emotional problems to people and/or animals inhabiting or working in the structure. With most of the current methods, the user or a contracted service must periodically replace the toxic substances in order to preclude termites and/or other crawling insects. The most effective toxic substance, chlordane, has recently been banned by the Environmental Protection Agency.

Therefore, it is an object of the present invention to provide a mechanical assembly mounted above ground on support and/or associated structures. This assembly has physical and other barriers arranged in a particular manner for preventing termites and other crawling insects from reaching critical areas of residential structures, commercial structures, and industrial structures.

It is a further object of the present invention to provide unobtrusive devices that are relatively inexpensive, easy to install, quick to maintain, and environmentally safe, while having physical and other barriers for preventing termites and other crawling insects from reaching critical areas of residential structures, commercial structures, and industrial structures.

It is a further object of the invention to utilize a bonding agent to provide an impervious bond between the assembly and the support and associated structures. The purpose of the bonding agent is to seal off any spaces, between the assembly and the support and associated structures, which would have permitted the termites and crawling insects to bypass the invention and thereby gain access to the residential structures, commercial structures, and industrial structures.

It is also an object of the invention to provide an assembly which may be utilized on new construction, as a retrofit on existing structures, or as an integral portion of manufactured or modular structures at the time the structures are originally manufactured.

SUMMARY OF THE INVENTION

These and other objects of the invention are achieved in an assembly which is securely bonded to support and/or associated structures, and positioned between ground level and the residential structures, commercial structures or industrial structures to be protected. Several embodiments of the assembly may be applied to different support and associated structures. The assembly includes an inner wall which provides a pathway leading from the lower part of the support and/or associated structure toward the rim of the assembly. A physical obstacle wall extends downward from the rim and cooperates with the inner wall to provide multiple-tactic, stereokinetic, elevation topographic, electrical impulse sensing, heat sensing, olfactory sensing and ultraviolet light barriers. A plate member extends outwardly from the bottom end of the assembly to provide multiple barriers.

BRIEF DESCRIPTION OF THE DRAWINGS

FIG. 6 is a cross sectional view of the alternate embodiment of FIG. 5 mounted above grade in conjunction with a slab support structure with wood construction.

FIG. 7 is a cross sectional view of the alternate embodiment of FIG. 5 mounted above grade in conjunction with a slab support structure with masonry construction.

FIG. 8 is a cross-sectional side view of a portion of the preclusion assemblies of FIGS. 4 and 5 showing a thickening 43 of an outer obstacle wall 39.

FIG. 9 is a cross-sectional view of a portion of the preclusion assemblies of FIGS. 4 and 5 showing interference with light rays 51, 53.

FIG. 10 is a cross-sectional view of a portion of the preclusion assemblies of FIGS. 4 and 5 showing interference with ultra-violet light 121.

FIG. 11 is a cross-sectional view of a portion of a preclusion assembly embodiment showing interior and exterior moats.

FIG. 12 is a cross-sectional view of a portion of a preclusion assembly embodiment showing multiple physical obstacles.

FIG. 13 is a cross-sectional view of a portion of a preclusion assembly embodiment which retards the deposit of foreign materials on an obstacle wall 39.

FIG. 14 is a cross-sectional view of a portion of a preclusion assembly embodiment showing an alternate attachment of a plate member 18 to a leg member 20, 20A.

DETAILED DESCRIPTION OF THE PREFERRED EMBODIMENTS

Figure 1:
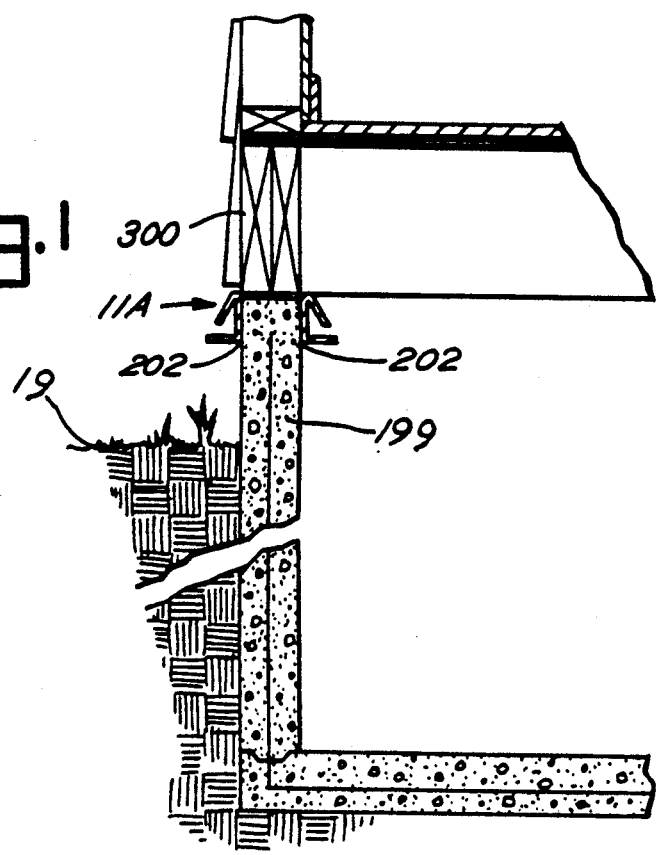
FIG. 1 is a cross sectional view of an insect preclusion assembly embodiment installed on a foundation or basement wall.
Figure 2:
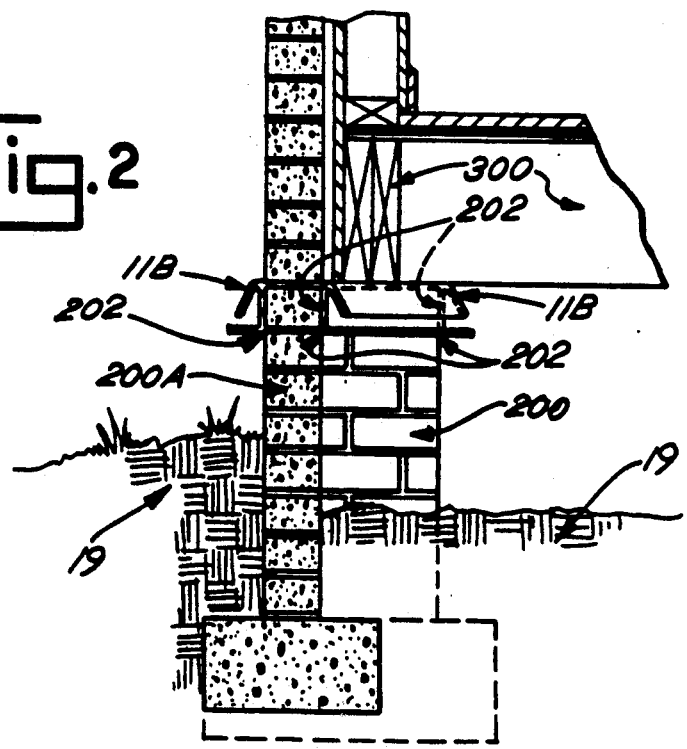
FIG. 2 is a cross sectional view of an insect preclusion assembly embodiment for residential, commercial, and industrial structures mounted on a perimeter pier support structure in conjunction with an external veneer or facia.
Figure 3:
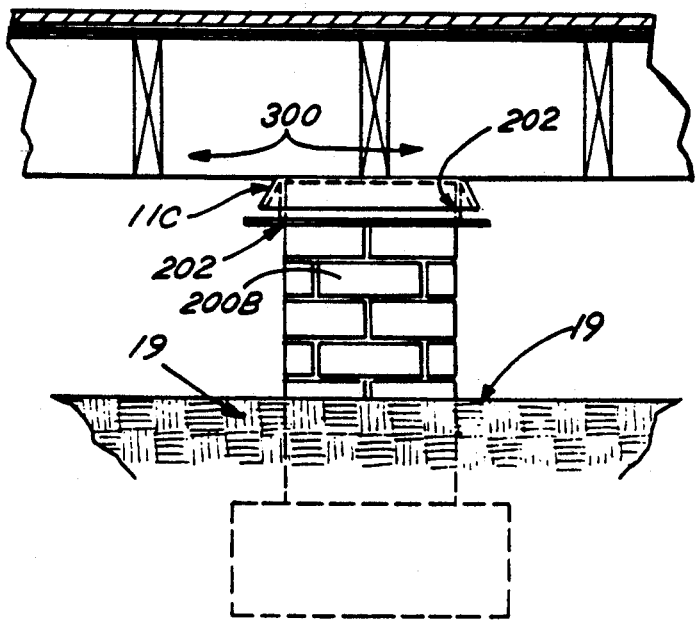
FIG. 3 is a cross sectional view of another embodiment of the preclusion assembly for residential, commercial, or industrial structures mounted on an internal pier support structure.

Referring to FIG. 1, an insect preclusion assembly 11A is mounted onto a foundation wall 199 which supports a structure 300 above ground 19. As shown in FIG. 2, a second preclusion assembly 11B is mounted onto a perimeter pier 200 and external veneer or facia 200A. As shown in FIG. 3, a third preclusion assembly 11C is mounted onto an internal pier support 200B. The details of assemblies 11A, 11B, and 11C will be discussed in reference to an enlarged view of a preclusion assembly 11D of FIG. 4.

Figure 4:
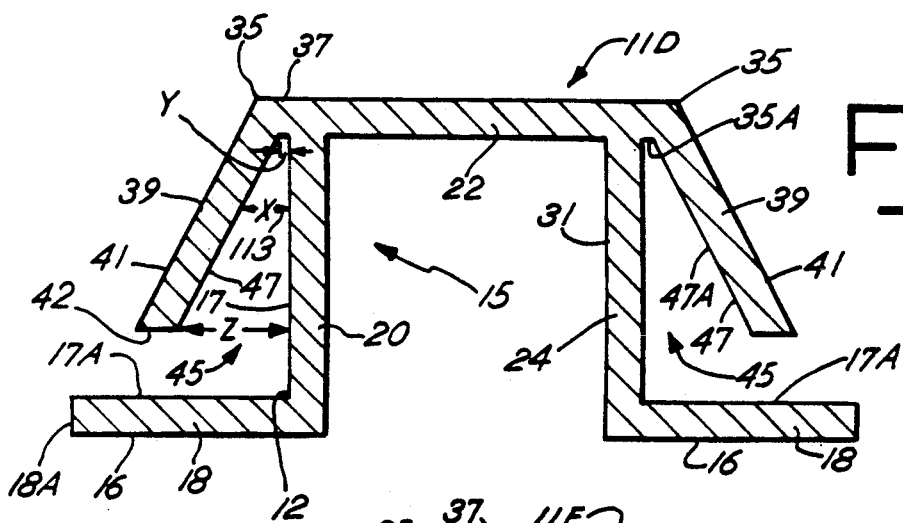
FIG. 4 is a cross sectional view of an insect preclusion assembly.
Figure 5:
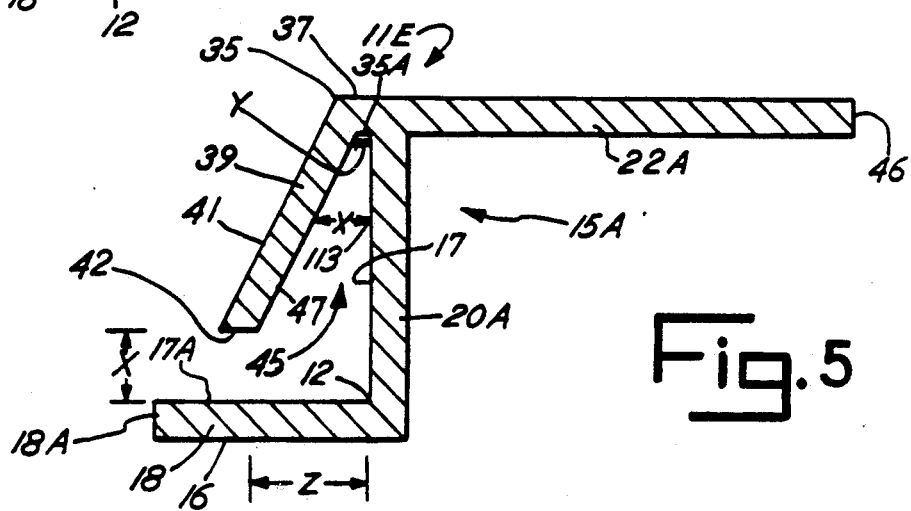
FIG. 5 is a cross sectional view of the alternate insect preclusion embodiment which is applicable to the many forms of slab support structures, for residential, commercial or industrial structures.

In another embodiment, a preclusion assembly 11E is shown in an enlarged view in FIG. 5. The preclusion assembly 11E is similar to assembly 11D of FIG. 4 but omits the right side of assembly 11D. Assembly 11E is a "one-sided" assembly. As shown in FIG. 6, a one-sided preclusion assembly 11F is mounted onto a wall support structure 200E bounded by a concrete slab 200C and supporting a wood frame construction 200F. As shown in FIG. 7, a one-sided preclusion assembly 11G is mounted onto a slab support construction formed of masonry or other relatively impervious construction materials 200D.

Referring again to FIG. 1, preclusion device 11A is positioned between ground 19 and structure 300. The assemblies 11A-11G are elevated above ground level to reduce the chances that foreign materials will lodge against them and render them ineffective. An impervious bonding agent is applied at 202 at the interface between foundation wall 199 and the insect preclusion device. The purpose of the bonding agent is to provide an impervious and inert bond between the preclusion assembly and the support structure. The bonding agent may be an elastomeric that has flexibility, as for example, RTV Silicone sold by 3M Company. The bond seals off any spaces between the assembly and the support structure which would permit termites or crawling insects to bypass the preclusion assembly and thereby gain access to the interior area of the structure 300. The bonding agent thereby requires the termite or crawling insect to attempt to reach the interior area of structure 300 only by way of assembly 11A. The bonding agent is placed around the entire interface where the assembly 11A meets the wall 199. Bonding agent is similarly placed at locations 202 on the support structures of FIGS. 2, 3, 6 7. In FIG. 6, the bonding agent 202 and device 11F jointly form a seal between the slab 200C and the wall support structure 200E.

By reference to FIG. 4, assemblies 11A-11D will be described in detail. By reference to FIG. 5, assemblies 11E-11G will be described in detail. Referring to FIG. 4, a three sided support member 15 is formed of three legs 20, 22 and 24 which are shaped to conform to the shape of the top surface and outside surfaces of support structures 199 (FIG. 1), 200 and 200A (FIG. 2) and 200B (FIG. 3). As shown in FIG. 2, assembly 11B may serve to cover facia 200A in the area where pier 200 is not present. In the area where pier 200 is present, assembly 11B extends outwardly from facia 200A and covers the pier as shown in FIG. 2.

Referring to FIG. 5, a two sided support member 15A is formed of two legs 20A, 22A which are shaped to conform to the top surface and outside surface of support structures 200E (FIG. 6) and 200D (FIG. 7). Area 400 in FIG. 7 represents either an integral footing or a piling. The assemblies 11F and 11G are one-sided since concrete 200C and 200D abut the wall structure.

Support member 15, 15A may take on any shape in order to conform to the size and shape of the support structures 199, 200, 200A, 200B, 200C, 200E, and 200D. Elliptical shapes, polygonal shapes, rectangular shapes, square shapes, and shapes formed of conjoint arcs may define the cross-sectional shape of the support and associated structures. The support structures may be pillars, walls, facia, slabs, or some combination thereof. The top leg member 22 of assembly 11D covers the entire top of the support structure(s). In FIG. 4, the side leg members 20,24 circumscribe the top member 22 and extend downwardly covering a portion of the two sides and the two ends of the top portion of the wall, facia or pillar so as to create a band around the top portion of the support structure. Where the support is circular in cross-section, side members 20,24 forms a single continuous cylindrical wall member, and top member 22 is a circular plate.

Referring to FIG. 6, top member 22A, in conjunction with bonding agent 202, is sized to cover the top of structure 200E, form a seal between slab 200C and structure 200E, and provide a relatively flat surface upon which wood frame construction 200F rests. As shown in FIG. 6, bonding agent 202 may be placed at the distal end edge 46 (FIG. 5) to seal the edge with respect to concrete slab 200C and structure 200E so that no insect may be permitted to crawl up inside surface 211 or outside surface 212 of wall 200E and reach interior area 225. As shown in FIG. 7, top member 22A is sized to cover a portion of the top surface of slab 200D and provide a relatively flat surface upon which structure 200G may rest.

It is specifically noted that support structures may be made of any material used for construction purposes. Bonding agent 202 fills in any spaces between support member 15 or 15A and support structures 199-200E.

Referring again to FIGS. 4 and 5, a plate member 18 is either formed integrally, frictionally attached, or bonded to the lower end of legs 20, 24, 20A of support members 15, 15A. Plate member 18 is constructed or attached orthogonal to legs 20, 24, 20A of support member 15, 15A.

Plate member 18 includes a bottom surface 16 which is generally flat having an outside dimension which may be either equal to or greater than the outer dimension of the preclusion devices. Plate member 18 also includes a top surface 17A which is flat and connects to bottom surface 16 via flat edge surface 18A. Side members 20, 20A include an outer flat surface 17 which meets with top surface 17A of the plate member along a line 12 which circumscribes the two sides and the two ends of wall 199 (FIG. 1). Surfaces 16, 18A, 17A and 17 provide a first pathway area which is the sole pathway for the termite or crawling insect to reach interior area of residential construction, commercial construction, and industrial construction 300, 200F, 200G. Assemblies 11A-11G cover the entire foundational support such that the crawling insect must traverse the first pathway area if it is to reach the interior of structure 300, 200F and 200G.

Devices 11D and 11E include an upper generally circular ridge 35 (or generally rectangular or otherwised shaped ridge 35 depending on the shape of cover member 22 or 22Aj) forming an outer circumference or outer perimeter of the device 11D and 11E. Ridge 35 defines the sole entry location of a crawling insect to reach the residential/commercial/industrial structures 300, 200F, 200G. An upper device lip 37 extends horizontally outwardly to ridge 35, as shown in FIGS. 4, 5, forming the rim of the termite and insect preclusion devices 11A-11G. A bottom surface 35A of the rim serves as an obstacle to prevent the insect from crossing the rim 35; this obstacle confuses one or more of the termite's or crawling insect's navigation systems.

An outer obstacle wall 39, which may be manufactured in variable lengths, extends downwardly from the rim 35 and the outer edge of upper device lip 37 and aesthetically forms an outer wall surface 41 of termite and insect preclusion devices 11A-11G.

Surface 41 may include an offset or thickened portion 43, (as shown in FIG. 8) for making the termite and insect preclusion devices more durable. The distance "x" that the lower edge of the outer obstacle wall 39 is above the upper surface 17A of plate member 18 must be of sufficient height: (1) to prevent the termite or crawling insect from reaching the wall 39 or thickened portion 43 directly from the pathway 17A, (2) to prevent the deposition of foreign materials (such as leaves, pine needles, etc.) that would provide a "bridge" for the termites or insects to circumvent a barrier area 45 created by the distance "x," or (3) to prevent the termites or insects from building a structure or tunnel that would circumvent the various insect preclusion devices previously referenced. Outer obstacle wall 39 and legs 20, 20A are both variable in length in order to accommodate different angles at which the devices may be installed, different types of termites and crawling insects to be precluded, and the type and amount of foreign materials to be excluded. For example, various types of termites and crawling insects account for a large majority of infestations of interior areas 300, 225, 227 of residential, commercial, and industrial structures. If the largest of the termites or crawling insects is approximately one-half of one inch in length, the bottom of the outer obstacle wall 39 should be established at approximately ⅜ "above the pathway 17A, i.e. a height such that the termite or insect cannot pull itself up onto wall 39. Where larger or smaller termites or crawling insects are to be expected in the particular environment, where the angle of installation is other than horizontal, where varying amounts and types of foreign material are to be excluded, and where structure or tunnel building by the insects is an issue; the distance between the bottom edge of outer obstacle wall 39 and pathway 17A, i.e. the distance "x" (FIGS. 4 and 5), may be adjusted upwardly or downwardly accordingly.

Referring to FIGS. 4 and 5, outer obstacle wall 39 is a single thickness member, which may be frustumconical in shape where top member 22 is circular. Obstacle wall 39 is secured along the entire extent of the outer generally circular or generally rectangular edge of upper device lip 37. Assembly 11D of FIG. 4 has two obstacle walls 39 which may or may not meet depending on whether the support structure is a single pillar, exterior piers with facia, a wall defining for example a continuous rectangular foundation without ends, a slab foundation, etc.

Outer obstacle wall 39 includes an inside surface 47 which connects with outer wall surface 41 via edge surface 42. Inside surface 47 confronts the outer surface 17 of the side walls 20, 20A, 24. Upper lip 37 spaces the upper edge of outer obstacle wall 39 from the upper edge of surface 17. Outer obstacle wall 39 is angled outwardly with respect to the side wall 20A, 20, 24 for providing a more open area between the lower portions of the outer obstacle wall 39 and the side wall 20A, 20, 24 as shown in FIGS. 4 and 5.

Outer obstacle wall 39 cooperates with side wall 20A, 20, 24 to form a partially enclosed barrier area 45 which prevents termites and crawling insects from entering the interior areas 300, 200F, 200G. In order to reach interior areas 300, 200F, 200G the termite or crawling insect must pass into barrier area 45 since the distance "X" is of sufficient height to prevent the insect from physically reaching up or building a structure or tunnel to reach outer obstacle wall 39. The first pathway area leads to a second pathway area formed by surfaces 35A, 47, 42 and 41. The first and second pathways connect in tandem and form a pathway which must be used by the pest to reach the ridge 35.

The spacing between inside surface 47 of outer obstacle wall 39 and outer surface 17 of side wall 20A must not be too small. As shown in FIG. 4, surface 47 is spaced from surface 17 by a maximum distance "Z" and a minimum distance "Y." Distance "Z" must be as large or larger than "X" so that the termite or insect will be required to travel between the two surfaces 47, 17 as it makes its upward climb along surface 17.

Referring to FIGS. 4 and 5, as the insect reaches point 113 on surface 17, it is at a point approximately "X" distance from obstacle wall 39. The termite or insect must travel at least between top surface 17A and point 113 before it can reach over to surface 47 of outer obstacle wall 39. This distance from top surface 17A to point 113 must be sufficient to draw the termite or insect into the barrier area 45 both between walls 20 and 39 (and walls 20A and 39) so that one or more of the following conditions occur: (1) termite's or crawling insect's -tactic responses will be confused, (2) the termite or insect elevation topographic sensing capabilities become disoriented, (3) the termite or insect electrical impulse sensing (seeking) capabilities become less effective, (4) the termite or insect heat sensing (seeking) capabilities become less effective, (5) the intensity of the ultraviolet light becomes insufficient for navigation and orientation purposes by the termite or insect, and (6) the termite or insect olfactory sensing capabilities will become confused. For example, with the distance "X" equal to ⅜ inches, point 113 should be approximately 1½ inches from top surface 17A of plate member 18 if the device is installed in a horizontal position. However, this distance will vary with the angle of the installation with respect to the horizon and other conditions previously stated. In use, the termite and insect preclusion device is installed on one or more of the support and associated structures shown in FIGS. 1, 2, 3, 6, 7. The distance "X": (1) creates a mechanical barrier or maze which disturbs or disorients the termite's or crawling insect's foraging activity; (2) increases the termite's or insect's Area Restricted Search (ARS) time making homing orientation more time consuming for a forager that may have reached the interior area 300, 225, 227 of residential, commercial, and industrial structures; (3) disrupts communication among termites and insects during the organization phase of cooperative search and foraging; (4) creates an open space ("X") that exceeds the combined body and foreleg length of the termites and insects which (a) prevents the termite and insect from 'pulling itself up' from plate 18 onto wall 39, and (b) prevents circumventing the devices by the building of a structure or tunnel by the termites or insects; (5) disrupts the trail pheromones of various termites or insects that may have reached the interior area 300, 225, 227 of residential, commercial, or industrial structures, and may have "jumped" from obstacle wall 39 to pathway 17A; and (6) attenuates the ultraviolet light used for navigation and orientation by termites and insects.

Termites and crawling insects search for food, shelter or other desired objectives in several modes: Area Restricted Search, olfaction, heat sensing (seeking) capabilities, electrical impulse sensing (seeking) capabilities, trail pheromones, visual cues and numerous sensorial modalities. Termites and insects initially locate food or some other objective by some combination of Area Restricted Search, vision, odor, heat sensing and/or electrical sensing modes in combination with a highly developed internal topographic map developed using multiple sensorial modalities and polarized or unpolarized ultraviolet light from natural or artificial sources. Once the food or other desired objective is discovered, a trail pheromone may be deposited by the successful forager as it returns to home (nest). Some portion of the insect colony follows the trail pheromone to the source of the food or other objective. The mechanical barriers of the preferred embodiments in FIGS. 1-7 disrupt and/or disorient the termite's and crawling insect's foraging activities.

The mechanical barrier disrupts or disorients foraging activity in a multiplicity of ways. Termites nd insects have -tactic responses. A taxis is a reflex or orientation movement by termites or insects in relation to a source of stimulation. Example taxes are Photo (light), Thigmo (contact, especially with a solid object), Geo (gravity), etc. Taxes may be used individually (one at a time), concurrently (more than one at a time), serially (one after another), and most taxes may be either positive or negative. Termites and insects may switch taxes rapidly and they may switch from positive to negative, or vice versa rapidly The use of taxes by termites and insects may vary with either or both the environmental states and/or current states of the termite or insect. Given this, obstacle wall 39 shades the outer surface 17 of the termite and insect preclusion device wall 20, the support member 15, and barrier area 45 from light rays; as represented by light rays 51, 53, in FIG. 9. As shown in FIG. 9, a shadow 55 appears on member 18, 20 and pathway 17A beneath the obstacle wall 39. The intensity of light within the barrier area 45 is typically lower than the intensity of light outside the barrier due to the shading of light by wall 39.

If the termite or insect is currently utilizing only its positive phototactic response mode, that is, it prefers to move toward light rather than away from light, as the termite or insect moves along pathway 17A of plate member 18, it moves into the shadow 55 (FIG. 9) cast by obstacle wall 39. The shadow deters the insect from entering barrier area 45 between the obstacle wall and the member 20. However, if the termite or insect begins to climb the outer surface or pathway 17 of the support member 15 to enter the barrier area 45, the termite or insect approaches a progressively darker area within the barrier area 45. The termite's response tendency may be to make a positive phototactic choice and exit barrier area 45 back towards the light.

If the termite or insect does not retreat back down outer surface 17, it will climb the outer surface 49 of support member 15 toward ridge 35. When the insect reaches surface 35A, it places itself in a position where all choices of further movement are positively phototactic. If the termite or insect is in either a negative phototactic response mode or alternating between positive and negative phototactic response modes, barrier area 45 would disorient or disrupt foraging and search activity. If the termite or insect is concurrently or serially utilizing other -tactic response modes, the disorientation/disruption would become more severe. For example, if the food, shelter, or other objective was initially located through olfactory senses, the insect would utilize, among other, the geotactic response mode to establish an elevation topographic reference point. If the termite or insect was concurrently operating in a negative thigmotactic response mode, it would not climb surface 17 of support member 20 when it was encountered. If it switched to a positive thigmotactic response mode, it would climb surface 17 of support member 20. As it climbed surface 17, the olfactory responses would diminish as it entered barrier area 45. Since it was previously operating either concurrently or serially in a geotactic response mode, it would receive conflicting stimuli. That is, the olfactory modality indicated the presence of a food supply or other objective. As the termite or insect climbed surface 17 to approach the area which the olfactory sense identified, the geotactic response mode would provide positive reinforcement, while the olfactory modality would provide negative reinforcement. The result would be disorientation of the termite or insect. The insect would then switch among -tactic responses to provide clarification. For example, it could switch to positive and/or negative phototactic response modes. If it were positive and switched to a negative phototactic response, it would again become disoriented when it reached 35A when all choices of movement would be phototactically positive. If it switched to a positive phototactic response mode at that point, it would most likely return from its original direction back down surface 17. Barrier area 45 effectively disorients the insect's combined sensorial modalities and -tactic responses. The claims made for the termite's or insect's olfactory responses are made in a like manner for both the heat sensing (seeking) responses and the electrical impulse sensing (seeking) responses.

Referring to FIG. 10, termites or insects utilize the ultraviolet portion of the light spectrum to provide navigation and orientation with respect to food, water, shelter, and other objectives of importance. Ultraviolet light sources may be natural or artificial and are used by termites or insects twenty four hours a day in any type of weather unless the insects are under a barrier that effectively blocks ultraviolet light, such as metal. Barrier area 45 attenuates the intensity of the ultraviolet spectrum by absorption, reflection, and light scattering. The ultraviolet spectrum loses its ability to provide navigation an orientation cues when it drops below a specified intensity level. Barrier 45 effectively attenuates the ultraviolet light so that termites or insects become disoriented when it is no longer effective for orientation or navigation. When the disorientation occurs, the termite or insect attempts to remove itself from barrier 45 in order to regain the ultraviolet navigation and orientation spectrum. The point at which the insect loses its ability to navigate by ultraviolet light is variable depending on: (1) the intensity of the ultraviolet source (e. g. sun's ultraviolet is more intense than moon's ultraviolet source) (2) the color and composition of plate member 18, pathway 17, and pathway 17A, (3) the coarseness or smoothness of pathway 17, pathway 17A, and plate member 18, and (4) the color, composition and material of the termite or insect preclusion device. Each of these four factors affect the degree of absorption, reflection and light scattering of ultraviolet light. Therefore, point 113 in FIG. 9 should be located at a point where the ultraviolet light has attenuated to a level sufficient to confuse the termite's or insect's navigation and orientation systems.

Referring to FIG. 10, a ray 121 representative of ultraviolet light of a certain intensity radiates as shown by arrows into the barrier area 45. The intensity of ray 121 is represented by its thickness. At points A, B, C, and D, the intensity of the ultraviolet light ray 121 is attenuated due to (1) absorption, (2) light scattering, and (3) reflection. Point D is the location of point 113 in FIG. 4.

Stereokinesis is an undirected movement which occurs when a termite or crawling insect encounters an orthogonal surface such as support member 15 or the interior ridge surface 35A. Specifically, the response mode of the insect when it encounters a circular or straight surface which is orthogonal to its direction of movement is that it chooses to follow the new surface structure rather than climb the route of the vertical wall. The stereokinetic effect in conjunction with the disruption of the -tactic response modes and the disruption and attenuation of the ultraviolet light sources used for navigation produce disorientation in the insect.

The preceding illustration may be expanded to the extent of the statistical permutations of the combined sensorial modalities, -tactic responses, stereokinetic movements of the termite or insect, and the degree of attenuation of the ultraviolet light used by the insect to navigate and orient itself.

A search mode utilized by termites and crawling insects is Area Restricted Search (ARS). Several methods of foraging or search activity exist within ARS; however, the design of the various embodiments has the same effect on all forms of ARS. Referring to FIGS. 4 and 5, the effect is that it increases search time through the use of surfaces 17A, 17, 35A and surface 47 as opposed to a single exterior wall or surface. The distance traveled in foraging activity is approximately three times further in the described embodiment. The increased ARS time makes homing orientation for the termite or crawling insect more time consuming which puts it as a comparative time disadvantage with competing foragers.

In addition to the ARS time disadvantages created by the various embodiments, a forager that does discover the food, shelter or other object source has a second disadvantage. When the termite's or insect's objective is discovered, it usually begins deposition of a trail pheromone which is volatile. Trail pheromones are specific scents used as a communication method to indicate the presence of a food or other objective source that is desired by the rest of the colony. A portion of the colony subsequently follows the trail pheromone. Because of the increased time required for homing due to surfaces 17A, 17, 35A and 47, the volatile characteristic of the deposited trail pheromones will produce three effects: a weaker odor (trail pheromone) signifying an unimportant food or objective source; no odor (pheromone) indicating no food or objective source; and/or a trail pheromone that, when compared to the trail pheromones of other foragers which have discovered a food or objective source at approximately the same time, is comparatively uninteresting with respect to locating a food or other objective source. Disruption of the communication process described above during the organization phase of cooperative search and foraging is known to be very dysfunctional to successfully accessing a food or other objective sources by a colony of termites or crawling insects. The organization phase refers to the recruiting of harvesters by the foragers.

FIGS. 4, 5, 8, 13, and 14 indicate a variable distance "X" that separates obstacle wall 39 from top surface 17A of plate member 18. The distance "X" must be greater than the combined length of both the forelegs and body length (from the tip of the mandibles to the tip of the gaster) of the termite or insect. This distance "X" prevents termites and crawling insects from "pulling themselves up" on to outer surface 41 or 43 or building a structure or tunnel designed to circumvent the insect preclusion devices.

Termites or crawling insects may reach interior areas 300, 225, 227 either by having a size exceeding the distance "x" or by successfully traversing surfaces 17A, 17, 35A, and 47, in addition to 41 and the top side of lip 37; as well as by building structures or tunnels designed to circumvent the devices. If the interior areas 300, 225, 227 are reached, the termite or crawling insect, may begin to deposit a trail pheromone or surface 41 of outer obstacle wall 39 as it leaves the desired objective. When the insect reaches the bottom of obstacle wall 39 (FIGS. 4 and 5) or the offset portion 43 in FIG. 8; it may elect to "jump" to upper surface 17A of plate 18. In that event, the trail pheromone will not be continuous. The forager will return to home and a portion of the colony will follow the trail pheromone to the point of discontinuity. The termite or insect's access to the food or other objective sources will be precluded because a continuous trail pheromone does not exist.

Since termites and insects may use air-borne scents to discover food, once the insect is within barrier area 45 between the obstacle wall and side wall, scent from the food no longer provides direction. It is noted that "food" to a termite may be most wooden objects. The scent would appear to the termite to be coming from plate member 18 or ground level 19. The scent travels around obstacle wall 39 and enters the barrier area from the plate member or ground level. This directs the insect to return to pathway 17A and to exit barrier area 45 rather than continuing the food or desired objective search within the barrier area.

Referring to FIG. 11, to provide a further barrier, if desired, insect poison or repellant may be placed on either or both of the inside surfaces 47, 17 of the barrier area or in receptacles 81 and 83 through port 87. Additional repellents may be placed in barrier 85. The poison and/or repellant may be of several types: spray, liquid, gel, or adhesive.

Referring to FIG. 12, another embodiment is illustrated in which additional physical obstacles 59, 60, 61 may be secured to the obstacle wall 39. The additional obstacles 59, 60, 61, may be frustumconical or linear in shape and cooperate with obstacle wall 39 in order to provide additional barrier areas 63, 65 for providing additional barriers operating in a similar manner to that previously described for barrier area 45.

FIG. 13 is another modification. Upper device lip 37 is elongated in such a manner that obstacle wall 39 extends downwardly and inwardly toward support wall 20. Barrier area 45 operates in the previously described manner, however, the horizontal distance "X" occurs at the lowest point of obstacle wall 39. Upper device lip 37B may also be constructed in a non-linear method as illustrated by the dotted line. This modification may be used if the devices 11A-11G are to be installed in positions or locales in which there is a likelihood that foreign objects (such as leaves, weeds, grass, pine needles, etc.) may lodge between any portion of plate member 18 and obstacle wall 39. The deposit of such foreign objects, as stated, would provide a "bridge" which would allow termites and crawling insects to by-pass barrier 45 and thereby gain access to interior areas 300, 225, 227. In the modification specified in FIG. 13, the maximum distance "z" will determine the length which upper device lip 37 or 37B will be elongated and thereby establishing the distance between inner surface 47 and outer surface 49. The purpose of the modification is to increase the difficulty with which the effectiveness of the invention may be reduced by fallen or wind blown foreign objects.

FIG. 14 illustrates an alternate method by which the plate member 18 may be attached to support member 20. Attachment methods include friction, use of slotted grooves, use of bonding agents, or any combination of the preceding attachment methods.

The insect preclusion devices 11A-G may be installed in series in order to reduce the probability of insect incursion into interior area 300, 225, 227. That is, the termites or crawling insects would be required to circumnavigate more than one device of the same type mounted on a specific installation. For example, two or more devices 11A may be mounted on one foundation wall 199 in tandem. To do so, a portion of the top member 22 or 22A must be removed and wall member 20 or 20A attached to each side of the foundation or slab at a location below the other device 11A-11G and secured with bonding agent 202.

The insect preclusion devices 11A, 11B, 11C, 11D, 11E, 11F, and 11G may be manufactured from a wide range of materials. The materials chosen would reflect the conditions surrounding specific installation and application problems.

The insect preclusion devices may be manufactured as a retrofit for existing structures; as an integral portion of manufactured or modular structures, or as an independent installation on new construction.

The methods described above interfere with termite and insect navigation and orientation systems in such a manner as to prevent them from reaching food and water sources, heat sources, or electromagnetic field sources as well as other desired objectives. This same method of preventing termites and crawling insects from reaching residential structures, commercial structures, and industrial structures may be used in other than the previously stated embodiments to prevent termites and crawling insects from reaching other food, water or objective sources. For example, crawling insects may be excluded from utility installations, pet feeding dishes, traffic control systems, security systems, street lights, airport electrical runway and strobe lights, greenhouses, plants in pots and trays, etc.

The term "termite" and "insect" has been used in a broad sense to include small pests of the crawling (land moving) variety which seek to enter residential structures, commercial structures, and industrial structures. Such pests may include gastropods (such as snails and slugs) and snakes.

It is to be understood, of course, that the foregoing describes different embodiments of the present Invention and that modifications may be made therein without departing from the spirit or scope of the present Invention as set forth in the appended claims.

We claim:

1. A pest preventer, for location on a structural foundation support which is disposed between ground and a structure to be protected, and which prevents a crawling pest of a predetermined size from reaching the structure via the foundation support, comprising;

a support member for receiving a structural foundation support in relative close fit relationship and having an outer surface, said outer surface having a ground side end and an upper end, a flat planar projecting member extending outwardly from said outer surface of said support member, said projecting member having an underside surface and an edge surface and a topside surface which with said outer surface forming a first pathway leading from beneath said outer projecting member to the upper end of said surface; and an obstacle member secured to said support member above said projecting member for blocking movement of a pest along said first pathway, said obstacle member having an inside surface ending in an edge separated from said topside surface by a distance greater than said predetermined size, said inside surface providing a second pathway leading in a direction away from said upper end of said outer surface and away from said first pathway, said inside surface of said obstacle member being disposed relative to said outer surface to form a phototactic barrier along said first pathway by shadowing thereof to discourage continued movement by a pest along said first pathway toward the structure to be protected.

2. A pest preventer according to claim 1 wherein said obstacle member includes a linear member depending from said upper end of said support member toward ground with increasing distance from said support member, at least a portion of the extent of said obstacle member having a distance from said support member greater than said predetermined distance.

3. A pest preventer according to claim 2 wherein said inside surface is linear in shape.

4. A pest preventer according to claim wherein said underside surface and said topside surface are orthogonal to a portion of said outer surface.

5. A pest preventer according to claim 1 and further including second obstacle means having a surface depending toward ground and being spaced from said inside surface for forming a second barrier area for providing multiple -tactic, ultraviolet light, stereokinetic, elevation topographic, electrical impulse sensing, heat sensing, and olfactory sensing barriers.

6. A pest preventer according to claim 1 and further including a bonding agent means for sealing the area between said pest preventer and the foundation support.

7. A pest preventer according to claim 1 wherein said support member, said projecting member and said obstacle member are formed integrally as one unit.

8. The pest preventer according to claim wherein said support member, said projecting member, and said obstacle member are positioned relative to one another to form a barrier area such that the ultraviolet spectrum within said barrier area drops below a specified intensity level 5 required for a crawling pest to navigate.

9. The pest preventer according to claim 1 wherein said support member, projecting member, and obstacle member are sized and are positioned such that the area restricted search mode utilized by termites and crawling insects is increased in time through the use of several surfaces instead of a single exterior surface.

10. A pest preventer according to claim wherein an insect repellant is placed on said outer surface of said support member, and said inside surface of said obstacle member.

11. A pest preventer according to claim 8 wherein a plurality of physical obstacles are secured to said edge of said obstacle member to provide additional barrier areas to disrupt a crawling pest's navigation.

12. A pest preventer, for location on a structural foundation support which is disposed between ground and a structure to be protected, and which prevents a crawling pest of a predetermined sized from reaching the structure via the foundation support comprising:

a support member having a first flat top leg and a second leg, said first flat top leg having a proximal end and a distal end, said second leg having an upper end and a lower end, said second leg being rigidly attached orthogonally at said upper end to said first flat top leg at said proximal end, said second leg extending downward from said first flat top leg to form a relative close fit relationship for receiving said foundation support, said first flat top leg and said second leg each having a first and second outer surface respectively, said support member having a complete outer surface comprised of said first and second outer surfaces, said complete outer surface having a ground side end and an upper end;

a flat planar projecting member extending orthogonally outward from said outer surface at said lower end of said second leg, said projecting member having an underside surface and an edge surface and a topside surface, said underside surface forming a first pathway leading from beneath said projecting member to the upper end of said outer surface; and an obstacle member with a top end and bottom end, said obstacle member secured to said proximal end of said first flat top leg at end above said projection member for blocking movement of a pest along said first pathway, said obstacle member having an inside surface ending in an edge separated from said topside surface by a distance greater than said predetermined size, said inside surface providing a second pathway leading in a direction away from said upper end of said support member, and away from said first pathway, said obstacle member spaced from said second outer surface of said second leg a distance sufficient to form a phototactic barrier along said first pathway by shadowing thereof to discourage continued movement by a pest along said first pathway toward the structure to be protected.

13. The pest preventer according to claim 12 wherein said first top flat leg of said support member is sized to cover a portion of the top surface of a slab to provide a relatively flat surface on which said structure to be protected may rest.

14. The pest preventer according to claim 12 and further including a bonding agent means for sealing the area between said pest preventer and said support structure.

15. A pest preventer according to claim 12 wherein said support member, said projecting member, and said obstacle member may be formed integrally as one unit or of separate components.

* * * * *